Patented June 21, 1949

2,473,796

UNITED STATES PATENT OFFICE 2,473,796

PREPARATION OF HETEROCYCLIC COMPOUNDS

Martin E. Hultquist, Bound Brook, N. J., assignor to American Cyanamid Company, New York, N. Y., a corporation of Maine No Drawing. Application February 2, 1946, Serial No. 645,250

8 Claims. (Cl. 260—250)

This invention relates to a method of preparing heterocyclic organic compounds, many of which are new.

The process of the present invention and the products which are prepared thereby may be illustrated by the following equation:

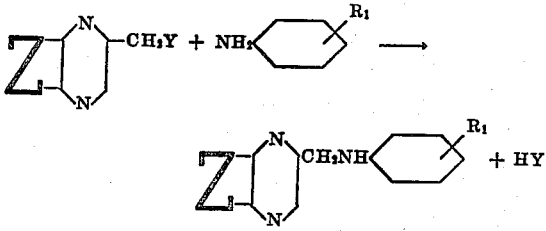

In this equation Z is the residue of a pyrimidine ring, Y is the residue of a tertiary amine or quaternary ammonium compound, and $R_1$ is a non-functional radical, insofar as the reaction of the invention is concerned, but which is important in determining the biological activity and other characteristics of the products.

The intermediates represented by the formula

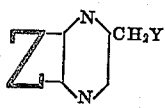

are new compounds, the preparation of which is described and claimed in my copending application, Serial No. 641,404, filed January 15, 1946, now Patent No. 2,466,897. These compounds are prepared by reacting an aromatic vicinal diamino pyrimidine with certain halogenated aldehydes, as described in that application and in Example 1 of the present application. In the formula the aromatic ring represented by Z may be a pyrimidine ring; which ring may be substituted with a variety of radicals, such as alkyl, amino, hydroxy, and others.

The symbol —Y may represent the residue of either at tertiary amine or a quaternary ammonium compound. When —Y is the residue of a tertiary amine it may be represented in greater detail by the radical —NRR' in which R and R' are the same or different aliphatic or aromatic radicals such as ethyl, isopropyl, octyl, phenyl, and the like and others in which the nitrogen atom is part of a ring structure, R and R' making up the remainder of the ring, as in the case of the radicals of morpholine and piperidine.

When —Y is the residue of a quaternary ammonium compound it may be further represented by the radical —NRR'R''X in which X is one of the halogens, preferably iodine, but may also be —OH, —HSO$_3$ or other known anion capable of salt formation with the cation of a quaternary base. R, R' and R'' may be aliphatic or aromatic radicals as defined above and may also join together to form a closed ring system with the nitrogen atom, as in the case of the radical of pyridine.

The compounds represented by the formula

may be a wide variety, including aniline, in which case $R_1$ is hydrogen, or an ortho-, meta-, or para-substituted aniline, in which case $R_1$ is some other non-functional radical. The most important group of intermediates represented by the above formula which may be used in the process of the present invention are the amides of aminobenzoic acid, including ortho-, meta- and para-aminobenzamide and other aliphatic and aromatic amides which may be formed by the reaction of an aminobenzoyl halide and an aliphatic or aromatic amine, such as ethylamine, ethanolamine, dodecylamine, ethylhexylamine, benzylamine morpholine, aniline, and others.

Of the various amides of aminobenzoic acid that may be employed as intermediates, the most important appear to be those of amino acids, particularly of glutamic acid, as, for example, p-aminobenzoylglutamic acid and polypeptides thereof such as p-aminobenzoylglutamyglutamic acid, p - aminobenzoylglutamylglutamylglutamic acid and others having a plurality of peptide linkages made up of one or more of the various amino acids, such as p-aminobenzoylglutamylglycylglutamic acid. Compounds prepared with these intermediates have a wide range of biological activity, particularly as growth factors for certain organisms and in stimulating the formation of haemoglobin in animals, and are the preferred products of the present invention. Of course, amides of p-aminobenzoic acid and other amino acids, such as glycine, aspartic acid, leucine, alanine, isovaline, cysteine, and the like, are also important intermediates of the present invention. The amino acids may be natural or synthetic and may be in any of the $d$, $l$, or $dl$ forms. These amino acid amides possess free carboxyl groups, and, as will be apparent, the salts and esters thereof may likewise be employed.

As the reaction appears to be dependent upon thermal dissociation of the Y group of the pyrazyl intermediate, it is necessary to heat the reactants to a fairly high temperature, usually between 100° C. and 200° C., but preferably between 140° C. to 180° C.

I prefer to conduct the reaction in a moderately strong alkaline medium although it is not necessary to do so. Best results have been obtained when using alkali metal alcoholates, such as sodium methylate, sodium ethylate, potassium methylate, and the like, although other bases such as alkali metal hydroxides, alkali metal carbonates, alkali metal acetates, alkali metal phosphates, pyridine, etc. may be used.

The reaction appears to take place with better yields under anhydrous conditions; that is, by simply heating the reactants together or in a non-aqueous solvent, preferably ethylene glycol, or other solvents, such as alcohols, ethers, hydrocarbons, and pyridine. This is particularly true when using the aminobenzoic acid amides as intermediates. The reaction will take place in the presence of water, however.

The invention will now be illustrated in greater detail by means of the following examples.

*Example 1*

To a solution of 64.8 g. (0.3 mole) 2,3-dibromopropionaldehyde in 200 cc. anhydrous ether is added 27 g. (0.3 mole) anhydrous pyridine, keeping the temperature of the reaction at 0° C. to 5° C. The slightly yellowish slurry is allowed to stand one hour at 0° to 10° C., then 100 cc. water is added to dissolve the product, and the ether layer is discarded.

The aqueous layer is added to a solution of 70 g. (0.33 mole) 2,4,5-triamino-6-hydroxypyrimidine dihydrochloride in 600 cc. water. To this brown solution is added 5-N-sodium hydroxide as necessary to keep the solution at about pH 4.0–5.0 and cooling in an ice bath to keep the temperature below 40° C.

After no more sodium hydroxide is required to maintain the pH at 4.0 to 5.0, there is added a solution of 25 g. iodine in 150 cc. water and 50 g. potassium iodide, which was enough to give a blue-black spot on starchiodide test paper. The N-[(2-amino-4-hydroxy-6-pyrimido[4,5-b]pyrazyl)methyl]pyridinium iodide starts to crystallize out and is filtered off after cooling. After drying it is satisfactory for use as an intermediate but may be recrystallized from water if desired.

To 300 g. (1.12 moles) N-(p-aminobenzoyl) glutamic acid ($\alpha[-16.01]_D^{25°}$ 2% in N/10 HCl), in 1 liter anhydrous ethylene glycol, was added 170 g. (3.04 moles) sodium methylate. To this was added 300 g. (0.8 mole) (2-amino-4-hydroxy-6-pyrimido[4,5-b]pyrazyl)methylpyridinium iodide having the formula,

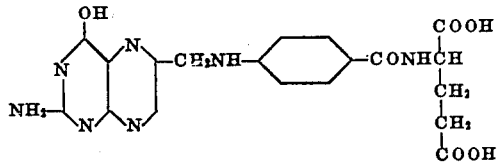

and the mixture was heated to 120° C. There was then added a solution of 10 g. sodium methylate in 50 cc. of anhydrous ethylene glycol, and the solution was heated to 140°–145° C. for 1½ hours. The dark solution was diluted to 10 liters, 100 g. filter aid was added and the alkaline solution was filtered. The filtrate on acidifying to pH 4 gave a precipitate of N-[4-}[(2-amino-4-hydroxy-6-pyrimido[4,5-b]pyrazyl)methyl]-amino}benzoyl] (1,+) glutamic acid having the formula

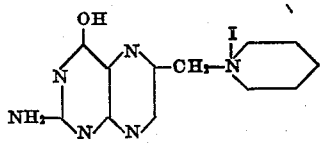

A sample of the crude material, after precipitation once as a barium salt and twice as a zinc salt, was converted to the sodium salt then precipitated as the free acid at pH 3.

*Example 2*

To 53 g. (0.2 mole) N-(p-aminobenzoyl) glutamic acid in 150 cc. anhydrous ethylene glycol was added 22 g. (0.4 mole) sodium methylate. To this was added 38.2 g. (0.1 mole) (2-amino-4-hydroxy-6-pyrimido[4,5-b]pyrazyl)methylpyridinium iodide, and the mixture was heated to 118–120° C. During three hours there was added 5.5 g. sodium methylate in 50 cc. ethylene glycol and the mixture was heated 13 hours more at 118–120° C. The dark solution was poured into 1 liter water, 20 g. of diatomaceous filter aid was added, the mixture was heated to 90°, and dilute hydrochloric acid was added to about pH 7.5. The insoluble material was filtered off, and the filtrate was acidified to pH 3 at 80–85° C. The crude material was further purified and found to be identical with the product of Example 1.

*Example 3*

To 5 cc. anhydrous ethylene glycol was added 0.8 g. (0.003 mole) p-aminobenzoylglutamic acid, and enough sodium methylate to give a pH of about 7.5 when a small sample was diluted with water.

To this was added 1 g. (0.0025 mole) (2-amino-4-hydroxy-6-pyrimido[4,5-b]pyrazyl)methylpyridinium iodide and 0.5 g. anhydrous sodium acetate. The mixture was heated to 170–190° C. for 5 minutes. The very dark solution when worked up, as in Example 2, gave 0.15 g., showing a chemical assay of 47.1%.

*Example 4*

By the process of Example 1, substituting an equimolecular amount of N-(p-aminobenzoyl)aspartic acid for the N-(p-aminobenzoyl)glutamic acid, there was obtained N-[4-}[(2-amino-4-hydroxy-6-pyrimido[4,5-b]pyrazyl)methyl]amino} benzoyl]aspartic acid having the formula

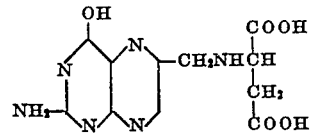

*Example 5*

When starting with aniline, N-(m-aminobenzoyl)glutamic acid, p-aminobenzoic acid, N-(p-aminobenzoyl)leucine, m-aminobenzoic acid, metanilamide, N-(metanilyl)glutamic acid or other substituted anilines, substituted for the N-(p-aminobenzoyl)glutamic acid of Examples 1 or 2, the products obtained differ only in the group —R of the general formula. The amount of sodium methylate should be decreased one mole for each free carboxyl group which is lacking in the starting compound as compared to N-(p-aminobenzoyl) glutamic acid.

These compounds are characterized by lack of melting point; they decompose indefinitely at high temperatures. They possess a yellow to brown color and show characteristic absorption bands in the ultraviolet region of the spectrum.

Example 6

To a solution of 2.4 g. (0.044 mole) sodium methylate in 100 cc. anhydrous ethylene glycol was added 19.2 g. (0.05 mole) (2-amino-4-hydroxy - 6 - pyrimido[4,5 - b]pyrazyl)methylpyridinium iodide and 16.1 g. diethyl N-(4-aminobenzoyl)glutamate. The mixture was heated to 140° C. and a solution of 0.6 g. (0.01 mole) sodium methylate in 3 cc. ethylene glycol was added.

After heating at 140–145° C. for 3 hours the mixture was poured into 500 cc. water, sodium hydroxide was added to bring the solution to pH about 11, 50 cc. more 5 N sodium hydroxide was added and the solution was allowed to stand overnight.

After the dark solution resulting was worked up as in Example 2, there was obtained diethyl N-[4-}[(2-amino-4-hydroxy-6-pyrimido[4,5 - b]pyrazyl)methyl]-amino}benzoyl]glutamic acid.

Example 7

To a solution of 1.2 grams (0.0044 mole) p-aminobenzoylglutamic acid and 1.0 gram (0.018 mole) sodium methylate in 10 cc. anhydrous ethylene glycol was added 1.0 gram (0.004 mole) 2 - amino - 4 - hydroxy-6-(diethylaminomethyl) pyrimidino[4,5-b]pyrazine having the formula

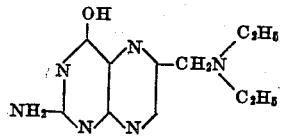

This clear solution was heated 4 hours at 140–160° C. After diluting to 100 cc. with water and acidifying to pH 3 with hydrochloric acid, there was obtained a brown precipitate. The precipitate was centrifuged out, washed with water and alcohol and dried. The dry product showed a purity of 19% when assayed by chemical means.

What I claim is:

1. A method of preparing compounds having the general formula:

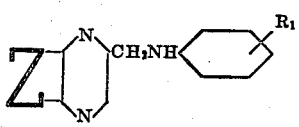

in which

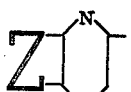

is a fused pyrimido pyrazyl radical and $R_1$ is a non-functional radical which comprises mixing together and heating to a temperature of at least about 100° C. a compound having the formula:

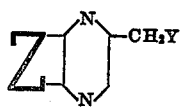

in which Y is a radical of the group consisting of those of tertiary amines and quaternary ammonium compounds, and a compound having the formula:

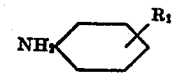

and recovering the said product.

2. A method of preparing compounds having the general formula:

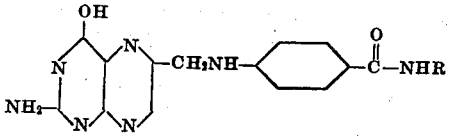

in which $NHR_1$ represents an amino acid radical which comprises heating at a temperature within the range 100° to 200° C. and a pH of at least 8 a quaternary ammonium compound having the formula:

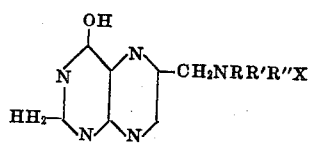

in which $NRR'R''X$ is the residue of a quaternary ammonium compound, R, R' and R'' being members of the group consisting of aliphatic and aromatic radicals and X being a salt-forming anion with a compound having the formula:

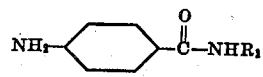

in which $NHR_1$ is as defined above and recovering the said product.

3. A method of preparing compounds having the general formula:

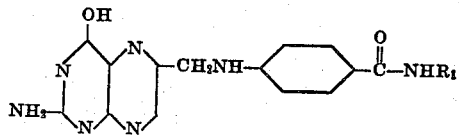

in which $NHR_1$ represents an amino acid radical which comprises heating at a temperature within the range 100° to 200° C. a quaternary ammonium compound having the formula:

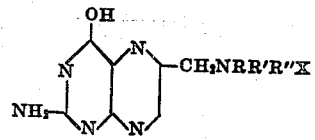

in which the group $-NRR'R''X$ represents the pyridinium iodide radical with a compound having the formula:

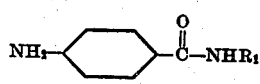

in which $NHR_1$ is as defined above with an alkali metal alcoholate in a substantially anhydrous solvent and recovering the said product.

4. A method of preparing compounds having the general formula:

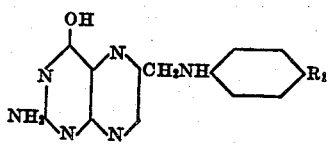

in which $R_1$ represents an aliphatic group attached to the benzene ring by an amide linkage which comprises heating at a temperature within the range 100° to 200° C. N-[(2-amino-4-hydroxy - 6 - pyrimido[4,5-b]pyrazyl)methyl]pyridinium iodide with an amide of p-aminobenzoic acid and recovering the said product.

5. A method of preparing N-[4-}[(2-amino-4-hydroxy - 6 - pyrimido[4,5 - b]pyrazyl)methyl]-amino}benzoyl]glutamic acid which comprises heating at a temperature from 100° to 200° C. (2-amino-4-hydroxy-6-pyrimido[4,5 - b]pyrazyl)methylpyridinium iodide with N-(p-aminobenzoyl)glutamic acid and recovering the said product.

6. A method of preparing compounds having the general formula:

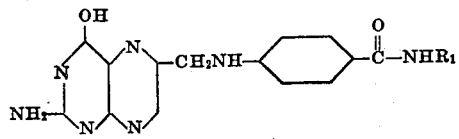

in which NHR₁ is an amino acid radical which comprises heating at a temperature within the range 140° to 180° C. a compound having the formula:

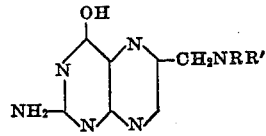

in which —NRR' is the radical of a tertiary amine, R and R' being members of the group consisting of aliphatic and aromatic radicals with a compound having the formula:

in which NHR₁ is as defined above with an alkali metal alcoholate in a substantially anhydrous solvent and recovering the said product.

7. A method of preparing N-[4-}[(2-amino-4-hydroxy - 6 - pyrimido[4,5 - b]pyrazyl)methyl]-amino}benzoyl]glutamic acid which comprises heating at a temperature from 100° to 200° C. a (2-amino-4-hydroxy - 6 - dialkylamino-methyl)pyrimidino[4,5 - b]pyrazine with N-(p-aminobenzoyl)glutamic acid and recovering the said product.

8. A method of preparing N-[4-}[(2-amino-4-hydroxy - 6 - pyrimido[4,5 - b]pyrazyl)methyl]-amino}benzoyl]glutamic acid which comprises heating at a temperature from 100° to 200° C. a (2-amino-4-hydroxy-6 - diethylamino - methyl)pyrimidino[4,5-b]pyrazine with N-(p-aminobenzoyl)glutamic acid in the presence of an alkali-metal alkoxide and an anhydrous organic solvent and recovering the said product.

MARTIN E. HULTQUIST.

No references cited.